United States Patent [19]

Baudet

[11] Patent Number: 5,097,784
[45] Date of Patent: Mar. 24, 1992

[54] SAIL OF ONE PIECE THREE DIMENSIONAL LAMINATED FABRIC HAVING UNINTERRUPTED LOAD BEARING YARNS

[75] Inventor: Jean-Pierre Baudet, Lausanne, Switzerland

[73] Assignee: North Sails Group, Inc., Milford, Conn.

[21] Appl. No.: 570,402

[22] Filed: Aug. 21, 1990

[51] Int. Cl.$^5$ .............................. B63H 9/06
[52] U.S. Cl. ............................... 114/103
[58] Field of Search ............... 114/103; 428/109, 110, 428/112, 292, 294; 156/179, 313

[56] References Cited

U.S. PATENT DOCUMENTS

| | | | |
|---|---|---|---|
| 2,565,219 | 8/1951 | Gardiner et al. | 154/116 |
| 3,903,826 | 9/1975 | Anderson | 114/103 |
| 3,954,076 | 5/1976 | Fracker | 114/103 |
| 4,444,822 | 4/1984 | Doyle et al. | 428/109 |
| 4,554,205 | 11/1985 | Mahr | 428/253 |
| 4,624,205 | 11/1986 | Conrad | 114/103 |
| 4,679,519 | 7/1987 | Linville | 114/103 |
| 4,702,190 | 10/1987 | Conrad | 114/103 |
| 4,708,080 | 11/1987 | Conrad | 114/103 |
| 4,815,409 | 3/1989 | Conrad | 114/103 |
| 4,945,848 | 8/1959 | Linville | 114/103 |

FOREIGN PATENT DOCUMENTS

| | | | |
|---|---|---|---|
| 7329287 | 11/1987 | Australia | 114/103 |
| 0056657 | 7/1982 | European Pat. Off. | |
| 0126614 | 11/1984 | European Pat. Off. | 114/103 |
| 0224729 | 10/1987 | European Pat. Off. | |

*Primary Examiner*—Sherman Basinger
*Attorney, Agent, or Firm*—Juettner, Pyle & Lloyd

[57] ABSTRACT

A one piece sail is made on a mold and includes an outer impervious layer, such as film, and an inner layer of continuous and uninterrupted yarns disposed in continuous trajectories from one edge of the sail to the other and carrying the majority of the load imposed on the sail.

19 Claims, 6 Drawing Sheets

SAIL OF ONE PIECE THREE DIMENSIONAL LAMINATED FABRIC HAVING UNINTERRUPTED LOAD BEARING YARNS

BACKGROUND OF THE INVENTION

This invention relates to sails for sailing vessels or other pliant lifting structures in which the sail or structure is constructed from a plaint sheet material and has a three dimensional airfoil shape for reaction with the wind.

Conventional sails are presently fabricated from a number of separate flat panels of woven cloth, cloth or film laminates, as well as laminates reinforced with yarns or threads. The flat panels are first cut or otherwise formed into the desired predetermined shape, and adjacent panels are joined together by sewing or broadseaming to provide a sail having a three dimensional or airfoil shape.

In the design of modern sails, one important consideration is the ability to control the strength and stretch characteristics of the fabric in particular directions and in certain locations in the sail body. This is sometimes accomplished by the use of selective, specialized o high strength materials, or by alignment of yarns in a cloth or laminate in the direction of maximum expected stress in the panel and in the total sail.

Rather than using woven cloth to make panels, the Conrad U.S. Pat. No. 4,708,080 and EPO patent 224,729 disclose using flat laminates of film and individual reinforcing threads to make flat panels for a sail, which are later jointed together in a conventional fashion. The resulting structure, however, will still have a number of seams between the adjacent panels, and these seams may contribute to excessive stretch or imperfect load transfer when the sail is placed under load. It is also known to apply reinforcing tapes to the outer surface of a finished sail but this is labor intensive, and the sail fabric between the tapes tends to fatigue earlier than normal.

Proposals have been made to form a sail on the three dimensional surface of a mold. The Gardiner et al. U.S. Pat. No. 2,565,219 discloses the use of overlapping strips of material, which are placed on a mold and heat sealed. This patent does not address the problem of overall stress distribution and compensation therefor in the overall sail.

Wagner patent EP 056,657 discloses the manufacture of a sail from a single piece of material by thermoforming. Reinforcing yarns may be included, but by necessity, these yarns or fibers must also be thermoformable, which would exclude many known types of reinforcing yarns or threads which are relatively non-extensible.

SUMMARY OF THE INVENTION

An object of the present invention is to provide a sail in which the body of the sail is in the form of essentially a one piece or unitary laminated and three dimensional construction, thereby eliminating or minimizing the need for seams and the attendant problem of stretch between the seams.

Another object of the present invention is to provide a sail of laminated construction in which the laminate contains interior continuous and uninterrupted primary load bearing fibers or yarns which extend substantially along and across the entire body of the sail and are arranged to bear most or all of the load along major stress lines in the entire sail.

Another object of this invention is to provide a sail having a smooth uninterrupted profile and having an ideal shape with no irregularities.

Another object is to provide a sail of unitary laminated construction in which interior continuous and uninterrupted threads or yarns are provided to directly support the sail along major and secondary lines of stress, and an impervious film layer is provided to provide protection and some minimal support along lines and angles relative to the major and secondary stress lines.

The foregoing objects are accomplished by forming a sail on an adjustable convex mold having a three dimensional surface or a series of contiguous three dimensional surfaces. A film layer is first placed on the entire surface of the mold, a plurality of pretensioned yarns or threads are placed over the film layer in a continuous and uninterrupted fashion, and the yarns are covered by an outer protective layer. The layers are laminated together by heat and/or pressure to provide a completed sail of unitary construction.

By disposing the yarns in a predetermined fashion along the known major average stress lines in the total sail, with the yarns also following the curvature or draft in the body of the sail body, it is possible to construct a sail having optimum strength characteristics for a wide range of conditions, as well as a higher strength to weight ratio, particularly in comparison with sails which have been constructed by prior art methods. Since individual fabric or laminate panels are not employed, the problems of panel joinder and seam stretch, and parasitic weight or failure are not encountered. In addition, the weight and density distribution of the yarns may be varied widely to accommodate more heavily stressed regions in the sail.

Unlike other sails in the prior art, the outer layer or layers of the sail laminate serve primarily as an impervious or nonporous air flow surface and secondarily as a substrate to hold the inner load bearing yarns in a fixed position in the laminate. Also, the load bearing yarns are disposed in a preformed, pretensioned and continuous three dimensional configuration corresponding to the final shape of the sail. Therefore, the load bearing yarns more accurately conform to or follow the actual complex curved stress lines generated in the sail. Moreover, since the load bearing yarns are continuous and uninterrupted, this results in a more smooth and uniform distribution of the stress, which would not be possible in an interrupted structure such as at seam locations, or at points of mechanical joinder of yarn ends, at which areas the stress tends to be concentrated or transferred in an uneven or unpredictable fashion.

THE DRAWINGS

DESCRIPTIONS OF THE PREFERRED EMBODIMENTS

Figure 9:
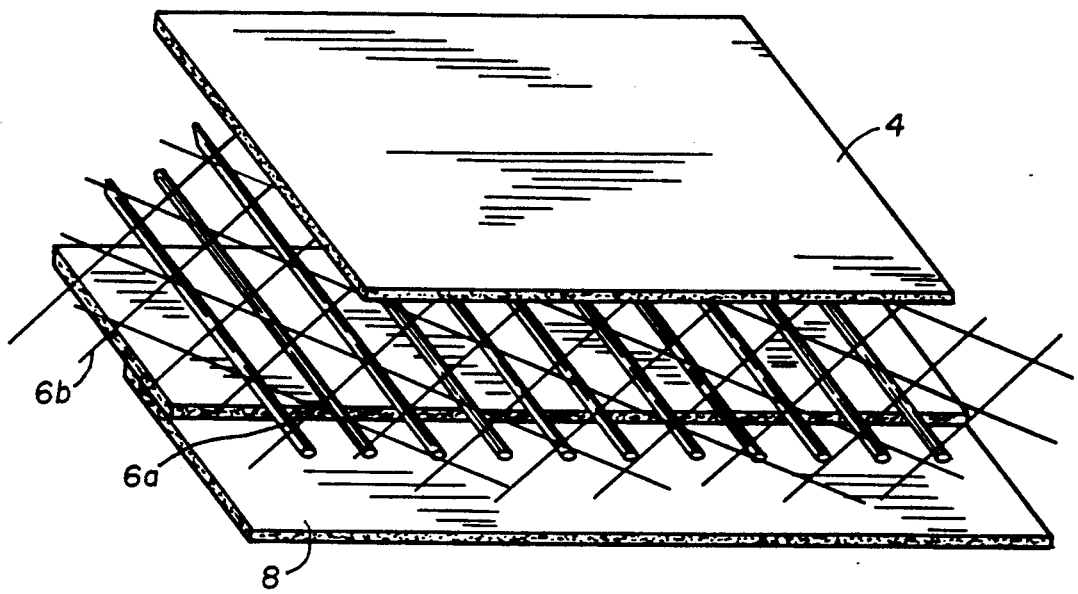
FIG. 9 is a perspective assembly view of a portion of the three dimensional laminate of the present invention.
Figure 10:
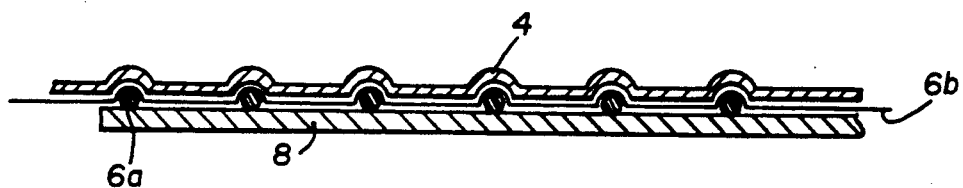
FIG. 10 is a sectional view of the completed laminate of the present invention.

As shown in FIGS. 9 and 10, the sail of the present invention comprises a three dimensional, molded, plaint laminate having three layers, namely, an outer base or structural film layer 8, a structural layer of load bearing yarns 6, which are disposed over the film layer, and an outer protective layer 4 over the yarn layer. The yarns in the intermediate layer are arranged in two different fashions. Some of the yarns 6a are aligned substantially along the calculated or predicted lines of stress in the total sail and generally extend continuously across the body of the sail, such as between the corners of a triangular sail, or between a corner and an opposed edge, as shown. Other threads 6b or yarns may be provided in an intersecting fashion with the primary load bearing yarns to provide strength and stretch resistance under changing wind conditions and trim on the sail.

The base film 8, is composed of a suitable polymer which is selected from available materials having properties in terms of sail materials. For example, desirable properties include elasticity within the range of utilization of 0 to 2%, high strength, light weight, heat resistant, ultraviolet light resistant, and non-porosity. The thickness of the film employed will range in the order from about 0.25 mil. to 3 mil. One preferred material is a polyester film sold under the trademark "Mylar". Other suitable film materials include, by way of example an not of limitation, polyolefins, such as polyethylene and polypropylene, aramids, plyamids, urethanes, and other available films which may fulfill the desired properties. In the alternative, other materials such as lightweight, tightly woven cloth, may be employed.

Preferably, the base film is thin and light in weight, such as thin Mylar film. Since the inner yarns may carry substantially all the loads, the thickness and strength of the base film layer is not critical, and the film serves to provide a continuous and smooth and non-porous outer surface, with the inner surface of the film providing a substrate on which the load bearing yarns are held in a fixed position. If desired, a thicker film may be employed to provide an added degree of protection, depending on the nature of the sail and the conditions under which the sail is used.

The term "yarn" or "yarns" as used herein shall denote continuous strands of threads or fibers, which may be multi- or monofilament in nature, and are selected from materials having good tensile strength and stretch resistance. Various yarns of this nature are available and include ones composed of polyester, aramid, polyolefin, carbon, polyamids, and the like, as well as blends and composites, such as, for example, aramid blended or wrapped with polyester. In general, an acceptable range of sizes of the yarns is in the order of from about 400 or about 4,000 denier.

The remaining outer layer 4 is employed primarily to protect the intermediate fiber layer and may be composed of the variety of light weight materials, including, films, woven fabrics, nonwoven fabrics, knitted fabrics, scrims and the like. In the alternative, the remaining outer layer may also provide some minimal structural properties of the laminate.

The thickness or weight of the film layer and the denier of the yarns are selected among a wide variety available and depend on the size, type, and wind range of sail being constructed.

Figure 1:
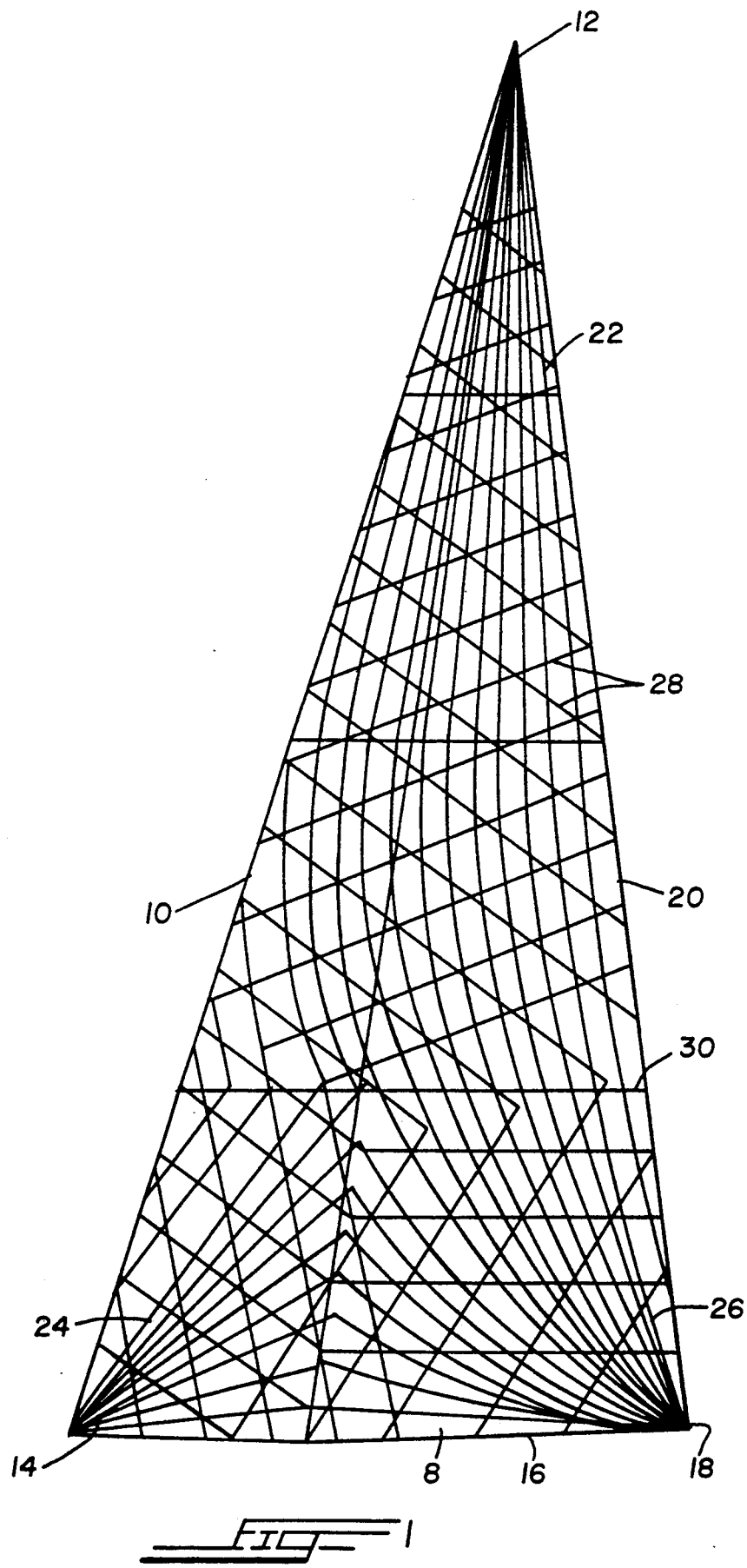
FIG. 1 is a plan view of the sail of the present invention.

A typical genoa sail made in accordance with the present invention is shown in FIG. 1 and comprises a base film layer 8 defining a luff 10 extending between the head 12 and tack 14, a foot 16 between the tack and clew 18, and a leech 20 between the head and tack. The sail has a triangular shape when viewed in plan but also has a molded airfoil shape or draft, which will be explained more fully herein. Obviously, the present invention is applicable to the manufacture of any type of sail, including, for example mainsails, foresails and the like, as well as related pliant lifting structures.

The primary load bearing yarns are shown as leading from the three corners of the sail toward the center, for example from the head at 22, from the tack at 24, and from the clew at 26. These yarns continue in an uninterrupted fashion across the body of the sail or have a path extending substantially from corner to corner, from corner to edge, or from edge to edge.

The yarns 22, 24 and 26 are arranged in the three dimensional laminate to correspond with, or be substantially in alignment with, or parallel to, the primary lines or regions of stress in the sail in three dimensions when in actual use. The regions of stress in the sail are caused by a variety of factors such as wind force and sail tensioning forces imposed, for example, by the halyard and trimming sheet attached to the clew, and also by the angle of the sail to the wind.

In addition, secondary yarns such as 28 may be provided in the sail to accommodate loads at angles to the primary lines of stress. While the major lines of stress in a sail may be determined for given conditions, it is well known that the conditions such as wind force, angle of attack, and sheet and halyard tension may change as the sail is being used. Typically, the secondary yarns will be smaller than the primary yarns.

Figure 5:
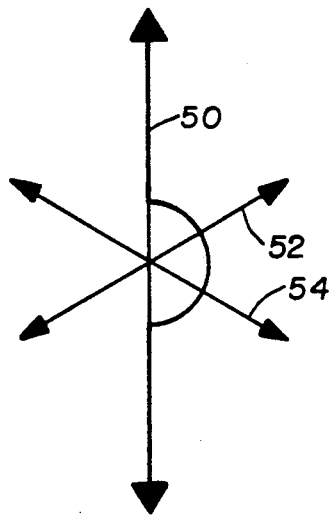
FIGS. 5 and 6 are layout patterns of reinforcing threads or yarns which are useful in connection with the presently described invention.
Figure 6:
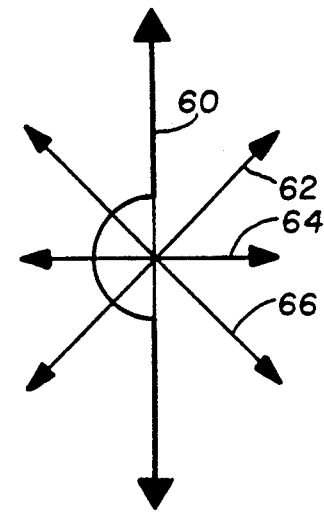

As shown in FIGS. 5 and 6, a major line or direction of stress is shown at 50 and 60 respectively. As shown in FIG. 5, reinforcing yarns 52 and 54 may be provided in two directions at angles to the load line 50. In the embodiment shown, the angles are substantially equal at about 60 degrees, plus or minus 20 degrees As shown in FIG. 6, the yarns may extend at three different directions relative to the major load line 60, as indicated at 62, 64 and 66. As shown, the secondary yarns extend at equal angles in the order of about a 45 degrees.

As a result of the foregoing arrangement, the secondary yarns 28 intersect the primary yarns and each other to form a continuous and uninterrupted support structure or cobweb over the entire surface of the sail in three dimensions. Needless to say, the spacing, pattern, density, size and composition of the yarns can vary in order to accommodate the more highly loaded areas or to provide desired physical characteristics and performance. The yarns shown in FIG. 1 are spaced apart to show the major stress lines, and in normal practice, a denser configuration would be employed.

To simplify construction, and for practical purposes, it is desirable to employ outer layers of films or fabrics which are furnished on rolls. The roll of film or fabric will be cut into the desired dimensions, and the sheets, for logistical reasons, will be temporarily overlapped or joined together along lines extending between the leading and trailing edges of the sail. For the purpose of illustration, the joinder lines are shown at 30 in FIG. 1.

Even though sheets of film may be employed as described above, the final sail will be panelless in nature since the film layers do not carry any substantial load any film joinder lines or areas of overlap are crossed by the uninterrupted fiber reinforcement at a plurality of locations. Also, the outer films or fabrics are laminated together and with the reinforcing fibers in a continuous fashion across the body of the sail. Therefore, any initial overlap between the outer film sheets become insignificant after the final lamination procedure. In the alternative, of course, a single sheet of film may be employed.

Figure 2:
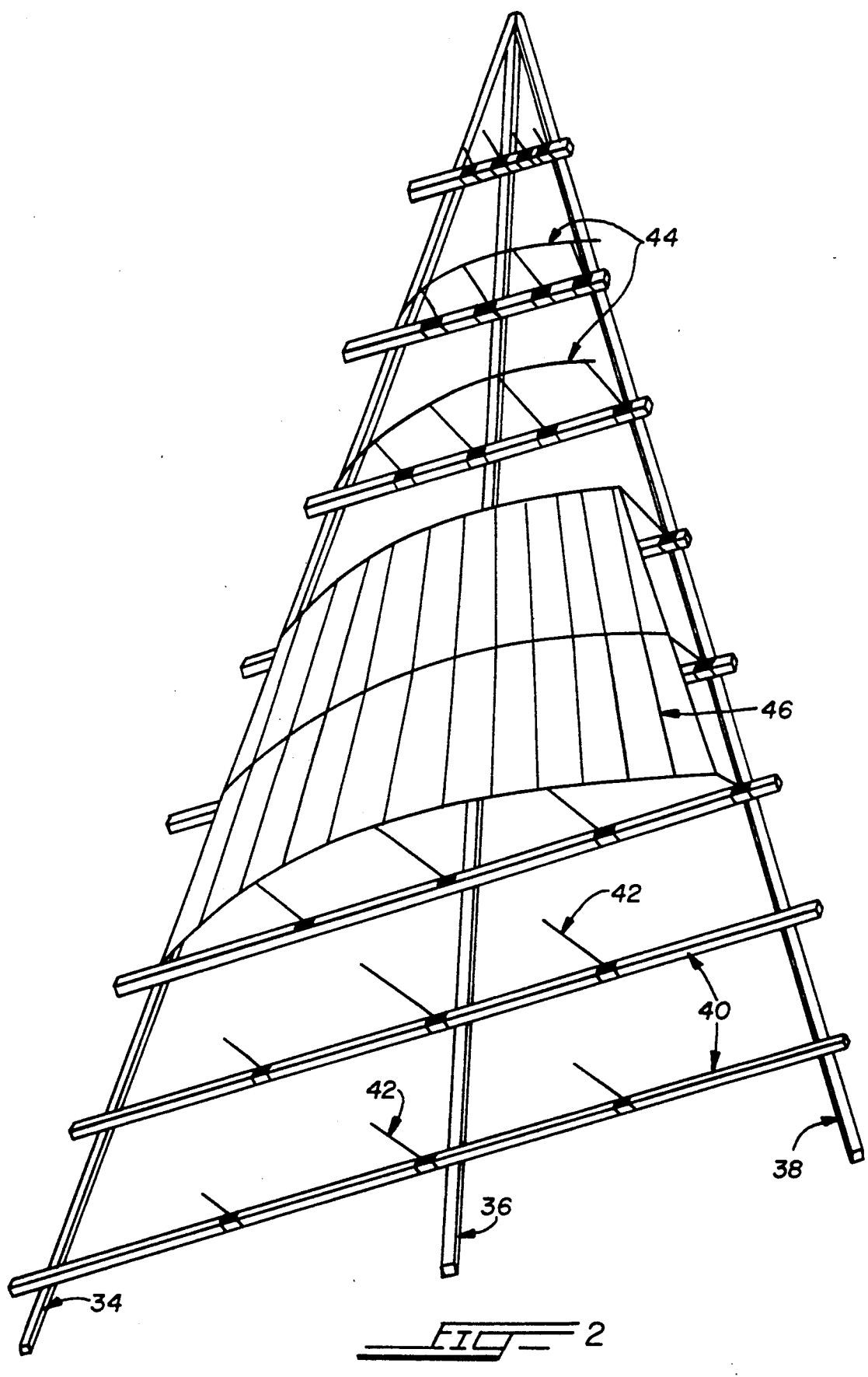
FIG. 2 is a schematic view of the apparatus used in fabrication of the sail of the present invention.

The manufacture of the sail will now be described in connection with FIGS. 2, 3, 4, 7 and 8. FIG. 2 schematically illustrates an adjustable convex upwardly facing mold surface which may be used to assemble and laminate the sail, and in the embodiment shown, a triangular sail.

The mold apparatus comprises a plurality of base support members 34, 36 and 38, which diverge from a common point in a triangular configuration. These support members are mounted in a fixed position. A plurality of transverse rail members 40 are mounted on and across the base members and are adjustably movable in parallel in a direction toward and away from apex of the base members, i.e., along the center line of the angle.

Each of the rails 40 carries a plurality of upright columns 42 which can be adjusted along various positions on the rail. Each of the columns 42 is preferably adjustable in height to define a plurality of areas of support for a three dimensional profile. On the upper ends of each series of columns is secured a flexible flat member 44, similar to a batten, with each batten defining a crosswise curvature.

Mounted on the flexible members 44 are a plurality of upper profile members 46, which are flexible and contiguous together to define the three dimensional surface of the mold. These members may be made, for example, from reinforced rubber, or the sections may each comprise a tube covered with flexible plates and covered with a rubber blanket. As a result, the mold surface is substantially continuous and uninterrupted. The various supports are adjustable to accommodate sails of various shapes and sizes.

Figure 3:
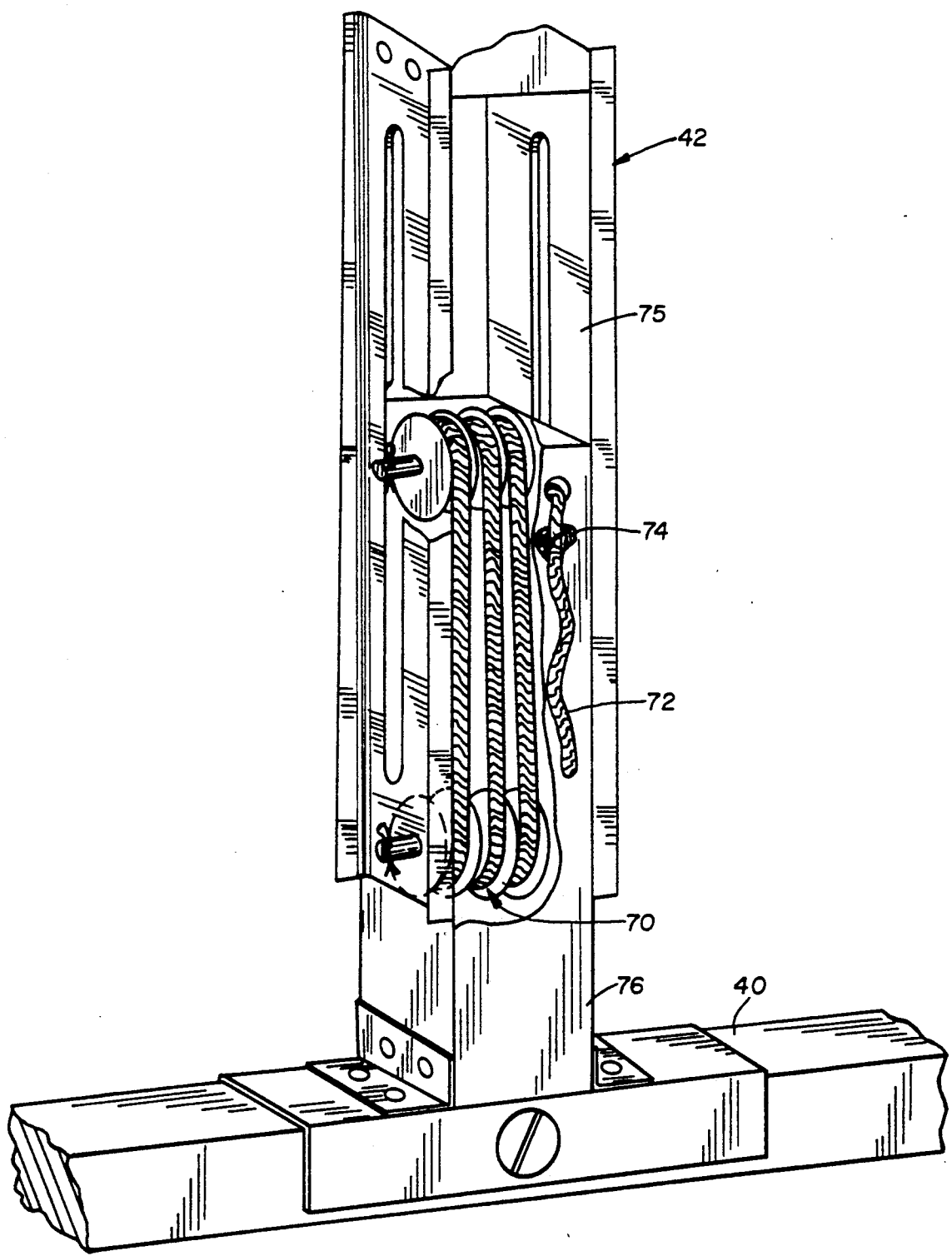
FIG. 3 is a perspective view of one portion of the apparatus shown in FIG. 2.

FIG. 3 illustrates a system for manual adjustment of the height of the columns 42. A known type of multiple part pulley arrangement, generally indicated at 70, may be provided with a line having an adjustable free end 72 secured by a cleat 74. The column 42 may comprise upper and lower portions 75 and 76 associated with the respective parts of the pulley system. The length of the line 72 is adjusted manually to adjust the height of the column.

Referring again to FIG. 2, assuming that the luff is to be molded starting at the left hand side of the mold, and the leech will terminate on the right side, the columns along the left side of the angle will define the luff, the columns along the right will define the leech, and the intermediate columns will define the draft of the sail.

Figure 4:
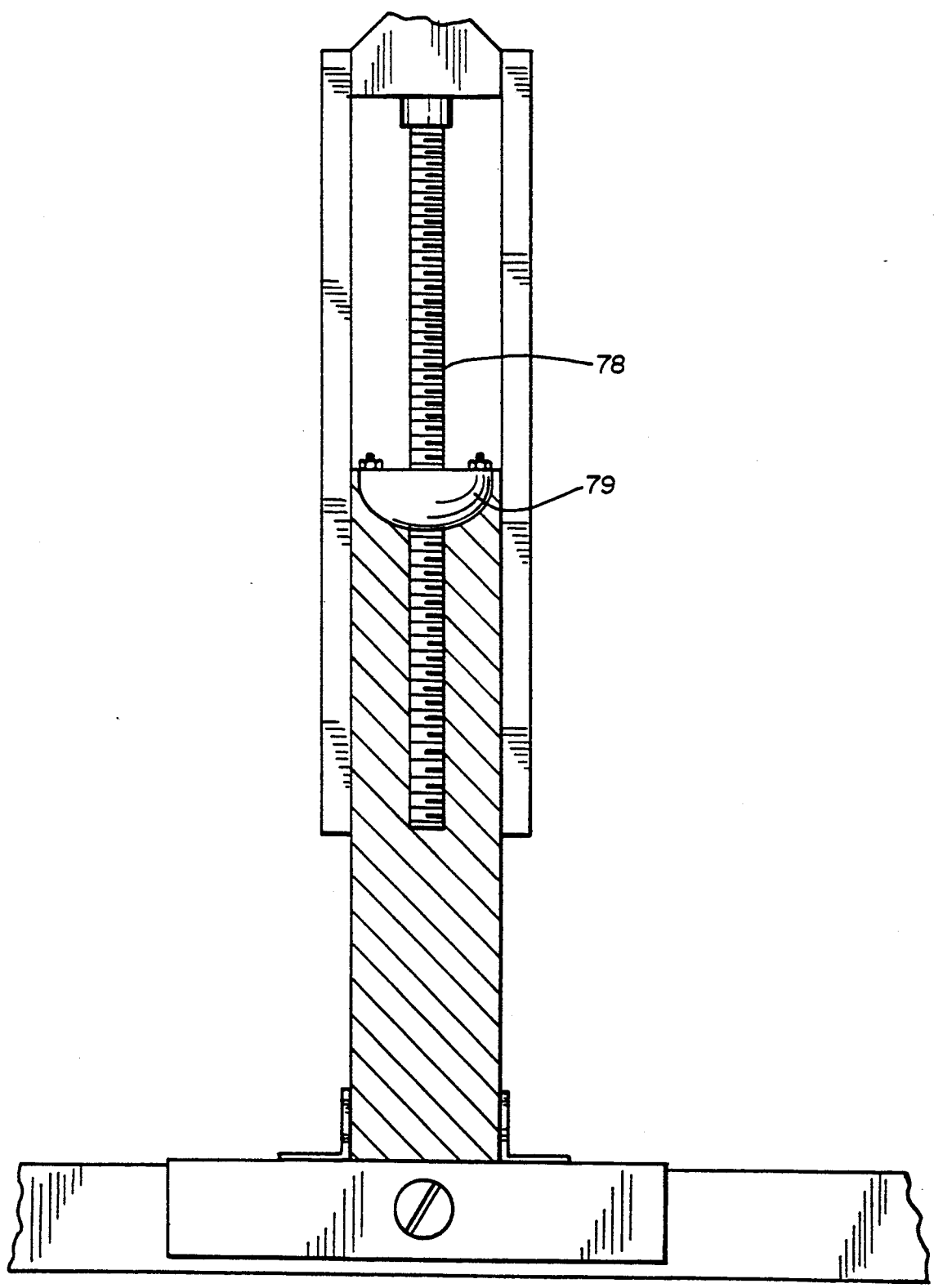
FIG. 4 is a partial vertical sectional view of one portion of the apparatus shown in FIG. 2.

FIG. 4 illustrates the height adjustment of the columns 42 by electrical means, in which the upper portion of the column has a vertical screw 78 and the lower portion includes a motorized nut 79 in threaded engagement with the screw. This version is most useful, for example, when the height settings are programmed into a computer for automatic-operation.

It may be seen from the foregoing that a three dimensional mold surface is provided, and the shape of the surface is adjustable. The fabrication of sails will now be described.

The lower film layer 8 is first assembled on the mold. If pieces of film are used for this purpose they may be overlapped or temporarily bonded together until the final lamination procedure has taken place. For example, film material may be removed from rolls, the panels marked and cut, such as with the assistance of a computerized plotter, and the cut pieces may be placed on the mold with the edges overlapping and adhesive between the edges.

After the film surface has been established, the primary and secondary load bearing yarns are placed onto the film in a pattern as described herein and shown by way of one example in FIG. 1. A majority of the yarns extend in a uninterrupted fashion across the three dimensional film surface from one corner or edge of the sail to the other.

Figure 7:
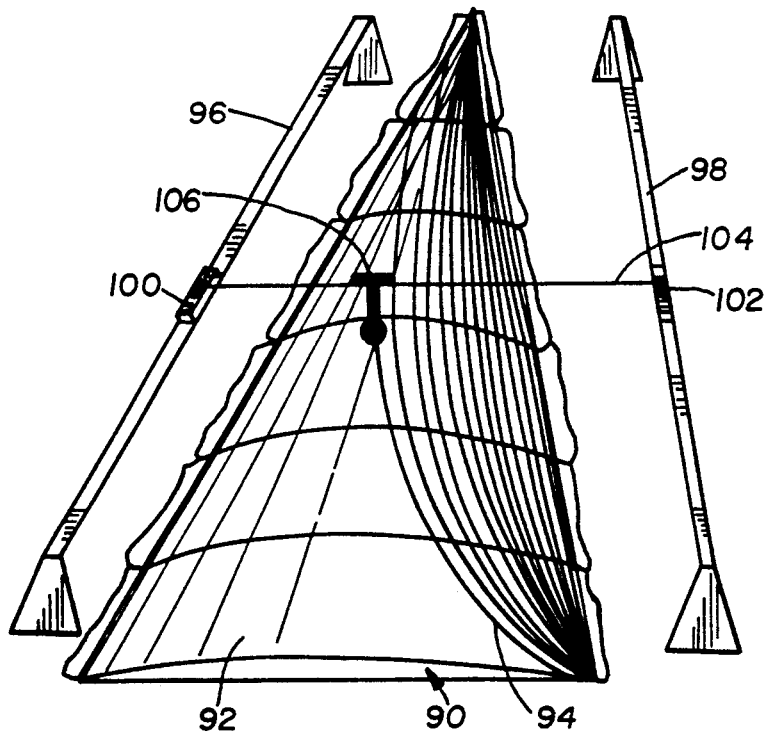
FIG. 7 is a perspective schematic view of the molded sail construction showing the application of the yarns to the base film on a three dimensional mold.
Figure 8:
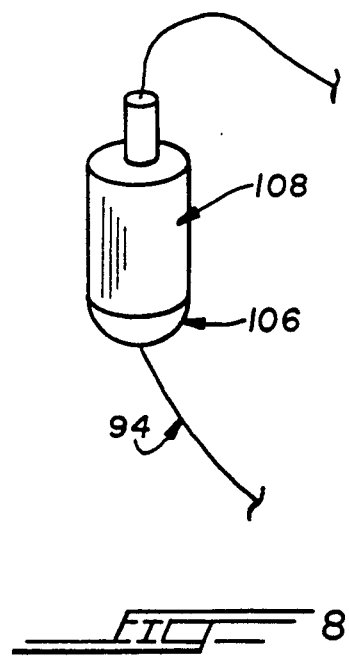
FIG. 8 is a vertical sectional view of a thread applicator head used in connection with the apparatus shown in FIG. 7.

FIGS. 7 and 8 illustrate a method and apparatus for applying the load bearing yarns to the base film layer. As shown, a mold 90 having a three dimensional continuous convex surface is provided. A film layer 92 is placed on the mold and restrained along the edges.

While the yarns 94 could be applied by hand, this would be a time consuming procedure, and preferably an automated system is employed. As shown, the yarn 94 may be applied to the three dimensional film layer 92 by means of an automater plotter generally comprising a pair of parallel elongated supports 96 and 98 located adjacent the outer edges of the mold surface and coextensive therewith. The supports 98 carry cars 100 and 102, which are movable on the supports. A transverse beam 104 is connected between the cars and extends over the mold surface. An automated thread applicator 106 is mounted on the beam 104 and is movable on the beam. The cars and applicator may be motorized and connected to a computer which establishes the pattern of application. Plotters having heads capable of movement in two or three dimensions are known and will not be described herein in detail.

The yarns are preferably applied under uniform tension to minimize distortions in the final laminate. Application is facilitated by first applying adhesive uniformly over the base film layer 92 prior to application of the yarn 94. Another particularly suitable method is to apply a hot melt or other adhesive to the yarn prior to application. As shown in FIG. 8, the thread applicator 106 may include a heating element 108 to heat or melt the adhesive on the yarn immediately prior to application to the film.

Upon completion of the yarn application step, additional adhesive may be applied over the entire surface, such as by spraying or roller application. In the alternative, the inner facing surface of the film may be uniformly precoated with a dry, thermally activated adhesive.

Following application of the fibers or yarns, the other outer layer is applied in a fashion similar to the base film layer.

The lamination is completed by completely curing the adhesive using heat or light and/or pressure, depending on the adhesive and materials employed. For example, a non-adherent cover sheet may be placed over the laminate assembly, and a partial vacuum may be created between the sheet and assembly to apply uniform pressure. If heat is required to cure the adhesive, this may be provided with heat lamps, heated blanket, or heated rolls.

After the adhesive has cured or set, the molded sail may be removed and any finishing operations completed, such as installation of a bolt rope, adding grommets, defining the luff line and the like. In addition, reinforcing elements may be added to the corners.

I claim:

1. A sail having a body extending between the edges thereof, said sail comprising a three dimensional, one piece laminate, said one piece laminate comprising an outer impervious layer of sheet material and an inner layer comprising load carrying yarns, said load carrying yarns being pretensioned and extending continuously and uninterruptedly between the edges of the sail, said yarns being laid in a three dimensional fashion in said laminate and carrying the majority of loads in the sail.

2. The sail of claim 1 wherein said sail comprises a pair of outer layers sheet material, and said inner layer is disposed between said outer layers.

3. The sail of claim 1 wherein said inner layer additionally comprises secondary yarns extending at angles to the load carrying yarns.

4. A sail having a body extending between the edges thereof, said sail having major lines of stress when placed in use, the body of said sail being a one piece, pliant molded laminate comprising a first outer impermeable layer, an inner layer comprising a plurality of stress bearing yarns being pretensioned and extending continuously and uninterruptedly across the body of the sail between the edges thereof in a preformed three dimensional fashion to accommodate said major lines of stress, a second outer protective layer over said inner layer, and adhesive means for bonding said layers together.

5. The sail of claim 4 wherein said sail has a plurality of corners and said stress bearing yarns extend in a radial fashion from said corners.

6. The sail of claim 4 wherein the first outer layer is composed of polyester film.

7. The sail of claim 4 wherein the first outer layer has a thickness of from about 0.25 mil. to about 3 mil.

8. The sail of claim 4 wherein the stress bearing yarns comprise aramid.

9. The sail of claim 4 wherein the inner layer comprises continuous secondary yarns intersecting with said stress bearing yarns.

10. A method for making a one piece, three dimensional sail using a convex mold surface, said method comprising placing a first sheet of impervious pliant material on said mold surface, with the sheet defining the borders of the sail and the three dimensional surface thereof, applying a plurality of continuous load bearing yarns in an uninterrupted fashion on said three dimensional sheet surface from one boarder to the other, applying a second pliant sheet over said yarns and said first sheet, and then laminating said sheets together on said mold.

11. The method of claim 10 comprising the additional step of applying adhesive between the sheets prior to laminating the sheets together.

12. The method of claim 10 wherein said load bearing yarns are applied to said first sheet under substantially uniform tension.

13. The method of claim 10 wherein said yarns are coated with adhesive prior to application to said first sheet.

14. The method of claim 13 wherein said adhesive is hot melt adhesive.

15. The method of claim 10 comprising the additional step of adjusting the three dimensional shape of the mold surface to define the desired three dimensional profile of the sail.

16. The method of claim 10 wherein the sail when placed in use has major lines of stress, and wherein said load bearing yarns are arranged along said major lines of stress.

17. The method of claim 10 wherein said first outer layer is composed of film.

18. The method of claim 10 wherein said mold surface is established by a plurality of adjustable and contiguous mold surfaces.

19. Tee method of claim 10 wherein the continuous strand of yarn is applied to said first layer using an automated plotter movable over said mold surface.

* * * * *